US011222474B2

(12) United States Patent
Kopeinigg et al.

(10) Patent No.: US 11,222,474 B2
(45) Date of Patent: Jan. 11, 2022

(54) METHODS AND SYSTEMS FOR APPLYING MACHINE LEARNING TO VOLUMETRIC CAPTURE OF A BODY IN A REAL-WORLD SCENE

(71) Applicant: Verizon Patent and Licensing Inc., Arlington, VA (US)

(72) Inventors: Daniel Kopeinigg, Palo Alto, CA (US); Andrew Walkingshaw, San Mateo, CA (US); Arthur van Hoff, Palo Alto, CA (US); Charles LePere, San Mateo, CA (US); Christopher Redmann, San Mateo, CA (US); Philip Lee, Palo Alto, CA (US); Solmaz Hajmohammadi, Palo Alto, CA (US); Sourabh Khire, Palo Alto, CA (US); Simion Venshtain, San Mateo, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/830,848

(22) Filed: Mar. 26, 2020

(65) Prior Publication Data
US 2020/0312011 A1 Oct. 1, 2020

Related U.S. Application Data

(60) Provisional application No. 62/824,459, filed on Mar. 27, 2019.

(51) Int. Cl.
| | |
|---|---|
| *G06T 7/70* | (2017.01) |
| *G06T 19/00* | (2011.01) |
| *G06T 13/40* | (2011.01) |
| *G06T 17/20* | (2006.01) |
| *G06K 9/00* | (2006.01) |
| *G06N 20/00* | (2019.01) |
| *G06T 15/04* | (2011.01) |
| *G06T 15/08* | (2011.01) |

(52) U.S. Cl.
CPC ........ *G06T 19/006* (2013.01); *G06K 9/00208* (2013.01); *G06N 20/00* (2019.01);
(Continued)

(58) Field of Classification Search
None
See application file for complete search history.

(56) References Cited

U.S. PATENT DOCUMENTS

| | | | | |
|---|---|---|---|---|
| 6,487,312 | B2 * | 11/2002 | Kostrzewski | ........... G06T 9/001 382/232 |
| 7,342,580 | B1 * | 3/2008 | Peterson | ................ G06T 9/001 345/418 |

(Continued)

OTHER PUBLICATIONS

Fechteler, et al., "Animatable 3D model Generation from 2D Monocular Visual Data", 2018 25th IEEE International Conference on Image Processing (ICIP), Athens, Greece, 2018, pp. 560-563, doi: 10.1109/ICIP.2018.8451630.

(Continued)

*Primary Examiner* — Steven Z Elbinger

(57) ABSTRACT

An illustrative volumetric capture system accesses a machine learning model associated with bodies of a particular body type, as well as a two-dimensional (2D) image captured by a capture device located at a real-world scene. The 2D image depicts a body of the particular body type that is present at the real-world scene. Using the machine learning model and based on the 2D image, the volumetric capture system identifies a 2D joint location, from a perspective of the capture device, of a particular joint of the body. The volumetric capture system also generates a three-dimensional (3D) reference model of the body that represents the particular joint of the body at a 3D joint location that is determined based on the 2D joint location identified using the machine learning model. Corresponding methods and systems are also disclosed.

20 Claims, 9 Drawing Sheets

(52) U.S. Cl.
CPC ............... *G06T 7/70* (2017.01); *G06T 13/40* (2013.01); *G06T 15/04* (2013.01); *G06T 15/08* (2013.01); *G06T 17/205* (2013.01); *G06K 9/00342* (2013.01); *G06T 2200/08* (2013.01); *G06T 2207/30196* (2013.01); *G06T 2207/30244* (2013.01); *G06T 2215/16* (2013.01)

(56) References Cited

U.S. PATENT DOCUMENTS

| | | | |
|---|---|---|---|
| 10,529,137 B1* | 1/2020 | Black | G06N 3/08 |
| 2010/0111370 A1* | 5/2010 | Black | G06K 9/00369 |
| | | | 382/111 |
| 2015/0379369 A1 | 12/2015 | Liang et al. | |
| 2019/0026942 A1* | 1/2019 | Zhang | G06T 7/251 |
| 2019/0213773 A1* | 7/2019 | Lee | G06K 9/00248 |
| 2019/0253638 A1* | 8/2019 | Wen | H04N 5/33 |
| 2019/0371080 A1* | 12/2019 | Sminchisescu | G06T 19/00 |

OTHER PUBLICATIONS

Mukai, et al., "Efficient Dynamic Skinning with Low-Rank Helper Bone Controllers", ACM Transactions on Graphics, Jul. 2016 Article No. 36 https://doi.org/10.1145/2897824.2925905.

Zuza, "Photogrammetry—3D scanning with just your phone/camera", https://blog.prusaprinters.org/photogrammetry-3d-scanning-just-phone-camera_7811/, 2018. (Year: 2018).

* cited by examiner

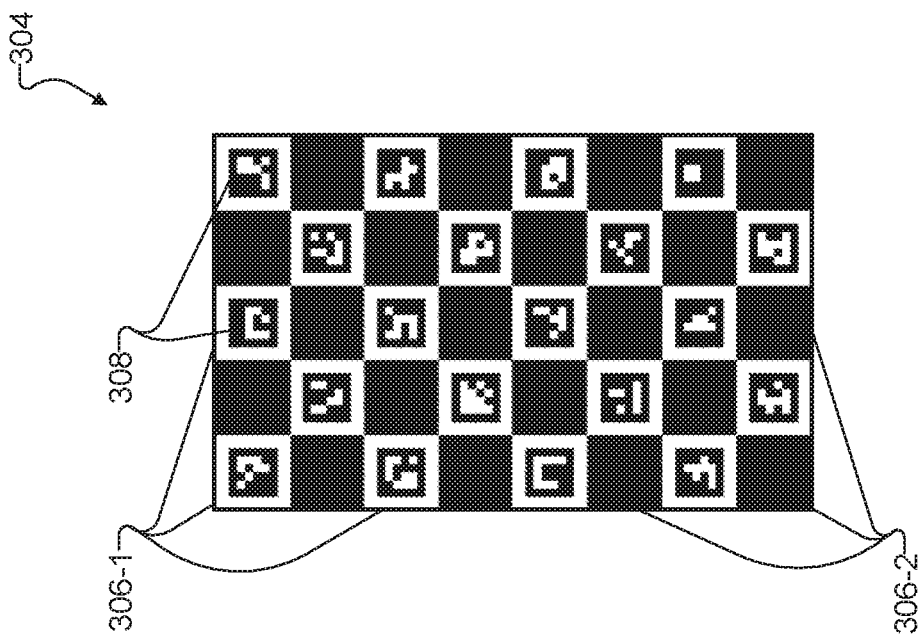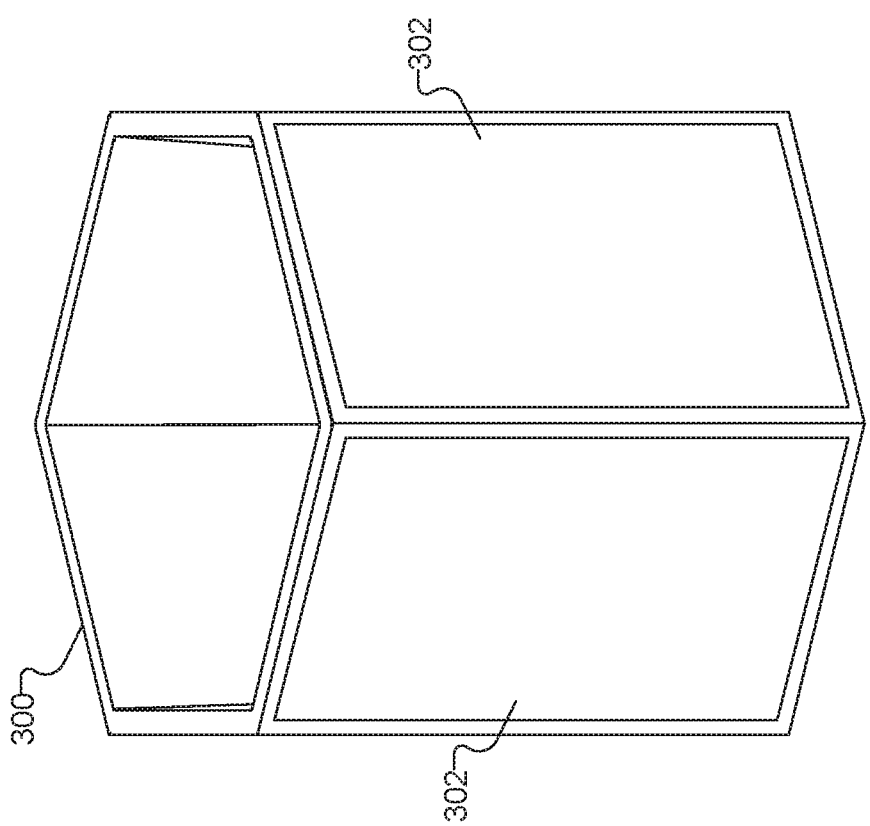
Fig. 3

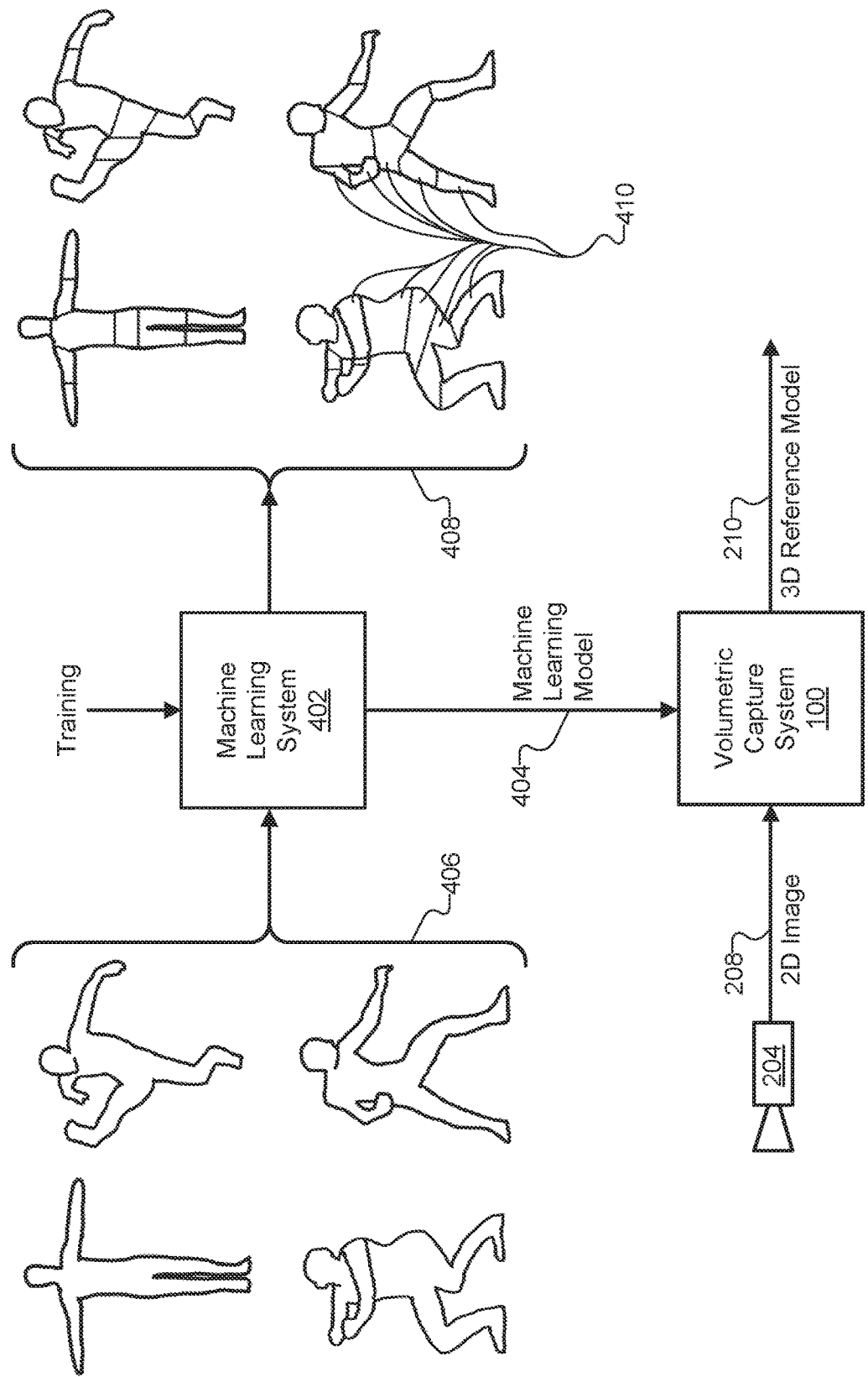

METHODS AND SYSTEMS FOR APPLYING MACHINE LEARNING TO VOLUMETRIC CAPTURE OF A BODY IN A REAL-WORLD SCENE

RELATED APPLICATIONS

The present application claims priority under 35 U.S.C. § 119(e) to U.S. Provisional Patent Application No. 62/824,459, filed on Mar. 27, 2019, and entitled "Machine Learning System for Cross Reality" (the "provisional application"). The contents of the provisional application are hereby incorporated by reference in their entirety.

BACKGROUND INFORMATION

In a variety of entertainment, educational, vocational, promotional, and/or other applications and use cases, it may be desirable to model various real-world objects within a real-world scene. For example, by modeling objects such as people, furnishings, walls, floors, and ceilings in a real-world room, a system may provide a virtual reality experience associated with the real-world room and the objects included therein to a user who is located somewhere other than the real-world room. As another example, by creating a model of a subject (e.g., a person, an animal, an inanimate object, etc.) that is present in a real-world environment, a system may provide an augmented reality experience involving the subject to a user. For instance, the model may be inserted as an augmentation into a real-world environment to make it appear as if the subject is present where the subject is not actually present, or the model may be represented within a virtual reality world being experienced by the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 shows illustrative aspects of a calibration fixture that may be used to calibrate the capture devices of the configuration of FIG. 2 according to embodiments described herein.

FIG. 4 shows illustrative aspects of how a machine learning model is created and used by the volumetric capture system of FIG. 1 to apply machine learning to volumetric capture of a body in a real-world scene according to embodiments described herein.

DETAILED DESCRIPTION OF PREFERRED EMBODIMENTS

Methods and systems for applying machine learning to volumetric capture of a body in a real-world scene are described herein. As described above, models may be created of various types of bodies (e.g., bodies of subjects such as people, animals, inanimate objects, etc.) in the real world. One way of creating such models is to volumetrically capture color and/or depth data representative of the bodies to be modeled. As will be described in more detail herein, a volumetric capture process may be performed efficiently, accurately, quickly, and/or in other beneficial ways when machine learning (e.g., machine learning data, techniques, technologies, etc.) is applied to the volumetric capture process. Moreover, any advantages benefiting the volumetric capture process will tend to be passed on as advantages to benefit other processes associated with the volumetric capture process (e.g., processes related to generating models based on the captured data, transmitting models to user devices, presenting models to users in extended reality experiences, etc.).

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein may provide one or more of the benefits mentioned above, as well as various additional and/or alternative benefits that will be explicitly described or made apparent below.

Figure 1:
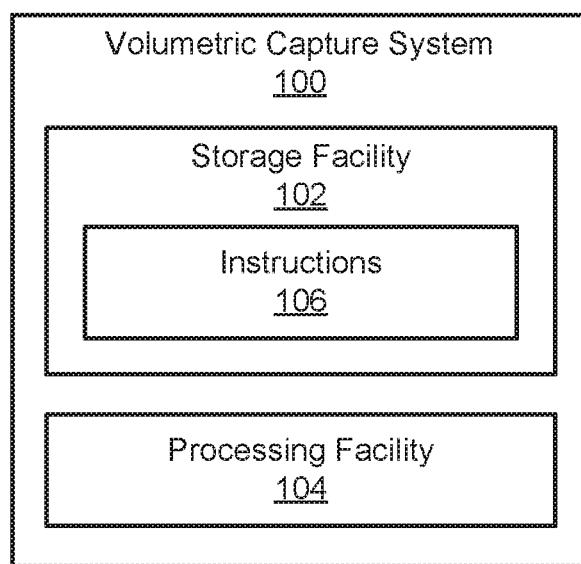
FIG. 1 shows an illustrative volumetric capture system for applying machine learning to volumetric capture of a body in a real-world scene according to embodiments described herein.

FIG. 1 shows an illustrative volumetric capture system 100 ("system 100") for applying machine learning to volumetric capture of a body in a real-world scene according to principles described herein. As shown, system 100 may include, without limitation, a storage facility 102 and a processing facility 104 selectively and communicatively coupled to one another. Facilities 102 and 104 may each include or be implemented by hardware and/or software components of a suitable computing system (e.g., processors, memories, communication interfaces, instructions stored in memory for execution by the processors, etc.) such as a server system, a mobile device, or the like. In some examples, facilities 102 and 104 may be distributed between multiple devices and/or multiple locations as may serve a particular implementation. Each of facilities 102 and 104 within system 100 will now be described in more detail.

Storage facility 102 may store and/or otherwise maintain executable data used by processing facility 104 to perform any of the functionality described herein. For example, storage facility 102 may store instructions 106 that may be executed by processing facility 104. Instructions 106 may be executed by processing facility 104 to perform any of the functionality described herein. Instructions 106 may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with applying machine learning to volumetric capture of a body in a real-world scene in any of the ways described herein. In one illustrative embodiment, for instance, processing facility 104 may be configured to access a machine learning model associated with bodies of a particular body type. For example, if the particular body type is that of a human, the bodies of the particular body type with which the machine learning model is associated may include the bodies of various people. For example, data representative of human bodies in various positions and situations that system 100 is likely to be tasked with analyzing may be included in a machine learning training database that is used to train up (e.g., generate, update, create, etc.) the machine learning model that is accessed by processing facility 104. System 100 may gain insights regarding human movement, possible orientations of the human body, and so forth from this machine learning model. Many of these insights would be difficult or impractical for system 100 to gain in ways other than by way of machine learning techniques. Accordingly, as will be described in more detail below, the machine learning model may facilitate system 100 in accurately interpreting and processing captured data representative of a human body in this type of implementation.

It will be understood that, in other implementations, the particular body type of the machine learning model accessed by processing facility 104 may be another body type (e.g., an animal body type, an inanimate object body type, a more specific human body type such as a man body type or a woman body type or a child body type, etc.). In such implementation, the accessed machine learning model may thus provide insights into various aspects of bodies of the applicable body type rather than the general human body type described above.

Processing facility 104 may further access a two-dimensional (2D) image captured by a capture device located at a real-world scene. For example, the 2D image may be an image captured by a camera (e.g., a video camera) or other capture device (e.g., a depth capture device) as a frame in a frame sequence (e.g., a video sequence) or may be a still frame that is captured (e.g., by a still camera) independently of any video capture. The captured 2D image accessed by processing facility 104 may depict, possibly along with other objects, a body that is present at the real-world scene. In particular, the body depicted by the captured 2D image may be of the particular body type with which the machine learning model is associated (e.g., a body of a particular person present at the real-world scene in the human body type example described above).

Using both the captured 2D data and the machine learning model that have been accessed, processing facility 104 may form a model of the body. To this end, for example, processing facility 104 may use the machine learning model and the 2D image to identify a 2D joint location of a particular joint of the body from a perspective of the capture device. The identified 2D joint location may be defined, for example, by 2D coordinates with respect to a particular element of the 2D image captured by the capture device (e.g., U-V coordinates with respect to a particular corner pixel of the 2D image, etc.). Processing facility 104 may then generate a 3D reference model of the body that represents the particular joint of the body at a 3D joint location that is determined based on the 2D joint location identified using the machine learning model.

In certain implementations, system 100 may apply machine learning in real time to the volumetric capture of a body in a real-world scene. For example, as the body moves within the real-world scene, capture devices may capture data representative of the body, and system 100 may immediately use a machine learning model and the captured data to generate and continuously update the 3D reference model to match the movement of the body.

As used herein, operations described as being performed by an implementation of system 100 (or components thereof, related systems coupled to system 100, etc.) in "real time" will be understood to be performed in a manner that allows for a 3D reference model to be generated and updated so as to mirror a body that is being modeled as the body moves about within a real-world scene (e.g., rather than generating the 3D reference model after the fact or in a time-shifted manner). For example, by operating in real time (i.e., by performing various operations described herein in real time), system 100 may provide, receive, process, and/or use data described herein (e.g., machine learning models, 2D images captured by capture devices, data representative of 3D reference models, etc.) immediately as the data is generated, updated, changed, exchanged, or otherwise becomes available. As a result, system 100 may be configured to continuously apply machine learning to volumetric capture of a body in a real-world scene based on relevant, real-time data so as to provide a live and relevant 3D reference model for use in any application being experienced by an end user (e.g., an extended reality experience using the model, etc.).

Accordingly, as used herein, operations or events that are described as occurring "in real time" will be understood to be performed immediately and without undue delay, even if it is not possible for there to be absolutely zero delay. In certain implementations, some real-time capabilities of systems and methods described herein may be enabled by distributed low-latency network technologies such as multi-access edge computing ("MEC") technologies, 5G provider network technologies, and so forth, rather than every implementation of system 100 being entirely implemented by localized computing resources (e.g., mobile device resources, local server resources, etc.).

Figure 2:
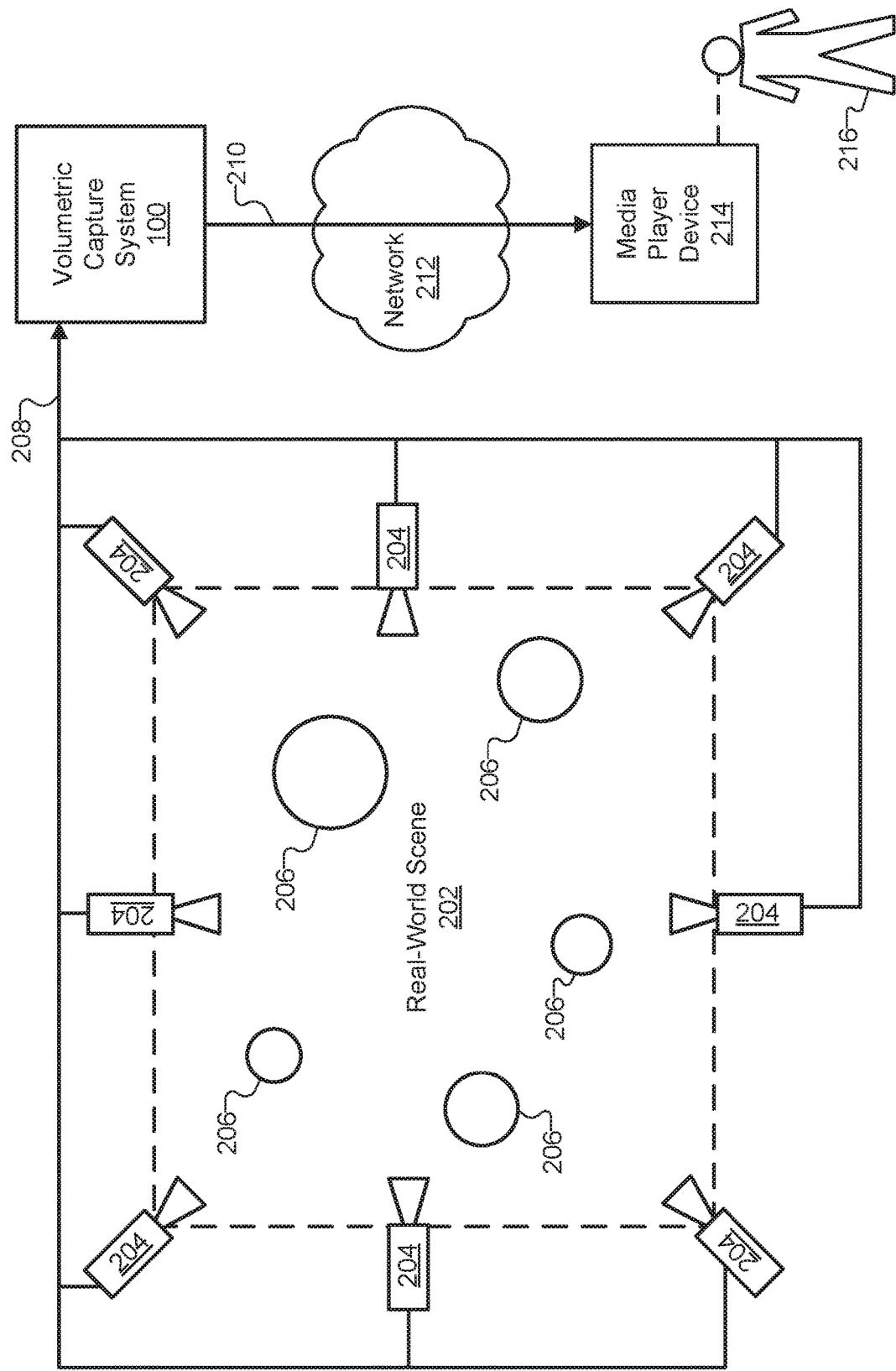
FIG. 2 shows an illustrative configuration in which the volumetric capture system of FIG. 1 operates to apply machine learning to volumetric capture of a body in a real-world scene according to embodiments described herein.

FIG. 2 shows an illustrative configuration 200 in which system 100 operates to apply machine learning to volumetric capture of a body in a real-world scene. Specifically, as shown, configuration 200 includes a real-world scene 202 that is being captured by a number of capture devices 204 disposed at various locations with respect to real-world scene 202 (e.g., disposed around a boundary of real-world scene 202) and that includes various bodies 206 depicted as differently-sized circles but understood to represent bodies of people, animals, inanimate objects, or the like. Real-world scene 202 may be implemented as any type of indoor or outdoor scene having any size or other characteristics as may serve a particular implementation. For instance, in one example, real-world scene 202 may be a studio setting where a single body 206 is included within the real-world scene for the purpose of generating and updating a 3D reference model. Conversely, in another example, real-world scene 202 may be a relatively large event venue such as a playing field where a sporting event is taking place or a stage where a concert or other such event is being performed. In these examples, several bodies 206 of several people or other suitable subjects may each be modeled concurrently.

In various examples, capture devices 204 may capture color data (i.e., red-green-blue or "RGB" data), grayscale data, depth data, or any combination of these or other suitable types of data representative of objects 206 within real-world scene 202. To this end, capture devices 204 may be implemented as camera devices (e.g., video cameras, still cameras, etc.) that generate 2D image data. Additionally or alternatively, capture devices 204 may include or be implemented by depth capture devices (e.g., time of flight depth capture devices, stereoscopic depth capture devices, etc.) that scan objects 206 from the respective vantage points of capture device 204 to determine spatial properties of the surfaces of bodies 206 in 3D space. In examples where capture devices 204 capture both color and depth data, the resultant data provided to system 100 may be referred to as "RGBD data" or "surface data."

System 100 accesses data representative of 2D images 208 (e.g., standalone 2D images, frames of 2D video images, etc.) captured and/or otherwise generated by capture devices 204 by way of a communication interface that communicatively couples system 100 to each of capture devices 204. For example, the communication interface may be implemented by a network interface or any other wired or wireless communication interface as may serve to transmit 2D images from a location of real-world scene 202 to a location of system 100 in a particular implementation. In some examples, system 100 may be present near real-world scene 202, while, in other examples, system 100 may be located in a separate location remote from real-world scene 202.

While operation of the implementation of system 100 described above (in relation to FIG. 1) was described in terms of a single 2D image from a single capture device, it will be understood that, in certain implementations such as the implementation illustrated by configuration 200, a plurality of 2D images 208 generated by a plurality of capture devices 204 (e.g., capture devices 204 disposed at different vantage points with respect to a particular body 206) may be used by system 100 as the basis for forming a 3D reference model. Specifically, for example, along with the first 2D image described above, system 100 may be further configured to access an additional 2D image 208 depicting a particular body 206 (e.g., the same particular body 206 depicted by the first 2D image). The additional 2D image may be captured by a different capture device 204 located at real-world scene 202. For example, the capture device 204 capturing the additional 2D image may have a perspective (i.e., a vantage point) distinct from the perspective of another capture device 204 that captures the first 2D image. Accordingly, along with the first 2D joint location identified from the perspective of the first capture device 204, system 100 may further identify an additional 2D joint location of the particular joint of the body 206 from the perspective of the additional capture device 204. The additional 2D joint location may be identified using the machine learning model based on the additional 2D image 208 in a similar way as the first 2D joint location is identified using the machine learning model based on the first 2D image 208.

Ultimately, the generating of the 3D reference model of the body 206 representing the particular joint of the body at the 3D joint location is performed based on both 1) the 2D joint location from the perspective of the first capture device 204 and 2) the additional 2D joint location from the perspective of the additional capture device 204.

The 3D reference model of the body generated by system 100 may be generated to take any form and may be provided for use in any application as may serve a particular implementation. For example, as shown in FIG. 2, a 3D reference model 210 generated (e.g., and continuously updated) by system 100 may be transmitted by way of a network 212 to a media player device 214 associated with a user 216. Network 212 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 212 may include elements of various interconnected networks that are outside of any provider network and outside the control of any provider of such a provider network. Elements of the Internet, a wide area network, a content delivery network, and/or any other suitable network or networks are examples of other elements that may be included within network 212. Any of these provider or non-provider networks or network elements may provide data delivery between system 100 and media player device 214, and may implement or employ any suitable communication technologies, devices, media, protocols, or the like as may serve that end in a particular implementation.

Media player device 214 may be implemented as any type of computing device used by user 216 to experience 3D reference model 210. For example, if 3D reference model 210 is to be presented as part of an extended reality experience (e.g., a virtual reality experience, an augmented reality experience) in which user 216 is engaged, media player device 214 may be implemented as an extended reality device (e.g., a head-mounted device) configured to present the extended reality experience. In the same or other examples, media player device 214 may be implemented as a general-purpose computing device (e.g., a mobile device such as a smartphone or tablet device, a personal computing device such as a laptop, etc.). Such a device may present an extended reality experience to user 216 that features 3D reference model 210 in certain examples. In other examples, such a device may present 3D reference model 210 in another suitable type of application such as a communications application (e.g., a 3D video phone), an engineering application (e.g., a 3D computer-aided design application), or any other type of application that makes use of 3D reference models.

Intrinsic and/or extrinsic calibration of capture devices 204 may be performed to allow 2D images 208 captured by multiple capture devices 204 to be processed and analyzed together to form 3D reference models 210 in the ways described above. For example, intrinsic calibration of each capture device 204 may result in appropriate intrinsic parameters (e.g., focal length, lens distortion, etc.) being defined for each capture device 204, while extrinsic calibration of the capture devices 204 may refer to the defining of the spatial relationship between the capture devices 204 at their respective vantage points with respect to real-world scene 202.

FIG. 3 shows illustrative aspects of a calibration fixture 300 that may be used to calibrate one or more of capture devices 204. As shown, calibration fixture 300 features a plurality of faces 302 (e.g., six faces 302 in the example of a hexagonal calibration fixture such as illustrated by calibration fixture 300) that may each depict a particular calibration pattern (faces are shown to be blank in FIG. 3 to indicate that any suitable calibration pattern may be applied). In some examples, the calibration pattern may be a chessboard pattern or a variation thereof. For instance, a calibration pattern 304 may be employed in certain implementations that features a chessboard pattern including squares 306-1 of a first color (i.e., white, in this example) that alternate with squares 306-2 of a second color (i.e., black, in this example), and wherein the chessboard pattern includes respective binary fiducial markers 308 associated with each square of the first color (i.e., different binary fiducial markers 308 in each white square, as shown).

While conventional methods of calibrating capture devices may involve manually holding a chessboard or other calibration pattern in front of each capture device in turn, a monolithic target such as calibration fixture 300 may increase ease of use and repeatability of calibration procedures while also decreasing calibration time since each capture device 204 is capable of capturing imagery associated with multiple faces 302 at any given time. A uniquely identifiable calibration pattern such as calibration pattern 304 with unique fiducial markers 308 allows for a calibration system responsible for performing the calibration (e.g., system 100 or another system) to determine which capture devices 204 have a view of which faces 302 at which times.

While calibration fixture 300 is shown to have six sides forming a hexagon, it will be understood that calibration fixtures according to principles described herein may have any suitable number of sides, each of which may feature a uniquely identifiable calibration pattern in the format of calibration pattern 304 but with unique fiducial markers 308. One consideration for designing a calibration fixture 300 is that each capture device should have a view of at least two different faces 302.

Due to possible non-uniform lighting conditions in real-world scene 202, an optimal exposure level for each capture device 204 may be determined to increase the reliability of the target detection. To make this determination, the calibration system may iterate through an exposure curve detecting all fiducial markers 308 within the field of view of each capture device 204. The optimal exposure for a given capture device may be taken as the lowest exposure value that detects the largest number of fiducial markers 308.

To increase the ease of operation to a calibration technician performing calibration procedures for capture devices 204, a process of detecting a global root camera and a graph of neighboring cameras may be automated. To calibrate capture devices 204 into a global coordinate system, the calibration system may define one of the capture devices 204 as the "root camera" and may generate a graph of all connections between capture devices 204 that have overlapping fields of view. Root camera detection involves performing fiducial marker detection on all capture devices 204 to find any capture devices 204 that see two particular adjacent faces 302. These capture devices 204 are the prospective root cameras. From here, any suitable rule may be used to determine which of the prospective root cameras is to serve as the root camera (e.g., whichever capture device 204 has the highest reprojection error, etc.).

The graph of the connections between capture devices 204 that have overlapping fields of view may be built by detecting fiducial markers 308 in all the capture device views. Due to the construction of calibration fixture 300, each face 302 may have a unique set of fiducial markers 308 (e.g., ArUco markers, etc.). The calibration process may involve searching, starting from the edges of the root camera, all the imagery captured by devices 204 to find an intersection of certain fiducial markers 208 (signifying shared boards). This process is repeated for all capture devices 204 to populate all of the edges of the graph. The goal from this process is to create a graph of all possible capture device neighbors in the system. From this process a shallowest possible tree with the root camera as the root node may be generated.

After such a tree has been generated, the branches of the tree may be used to form parent-child pairs that can be calibrated individually. For each pair of capture devices 204, all of the calibration patterns visible to the capture devices 204 may be detected. Then, for each calibration pattern in view of a particular capture device 204, the system may solve for the coordinates of the calibration pattern in a coordinate space of the capture device 204, and these coordinates may be accumulated. The accumulation process may be repeated for several frames (e.g., 10 consecutive frames, etc.) for each camera pair. Such accumulation over a plurality of frames may reveal if there is an error with the corner detection due to image noise. After all the points are detected in a pair of capture devices 204, an iterative solver may be used to determine extrinsic parameters between the capture devices 204. Once all of the capture devices 204 are thus calibrated to at least one neighboring capture device 204, the calibration system may calculate the extrinsic parameters of all of the capture devices 204 in the root camera coordinate space. Various optimizations and adjustments may also be made at this stage as may serve a particular implementation.

As a final step of the calibration process, the calibration system may calibrate the coordinate system of the capture devices 204 to the center of a stage area (e.g., a center of the area of real-world scene 202 denoted in FIG. 2 by dashed lines). In this way, the system may determine where the real ground is in the volume. Since depth data captured by capture devices 204 may be relatively noisy, depth maps generated by each capture device 204 may be averaged over a plurality of frames (e.g., ten frames in one example). Depth data may then be back-projected to camera coordinates and warped to the root camera coordinate system using the optimized extrinsic parameters from the previous stage described above. In some examples, points may be filtered based on a respective z-value (e.g., a depth value) from the capture device 204 to ensure the depth is reliable. After the depth is accumulated, this data is provided to a plane detector configured to fit planes within the data set using RANSAC or other filtering technologies. Once a perspective plane is received, the system may be configured to determine the center of the stage in that plane. The center of the stage is defined as the projection of the corner point of the average face 302 from the root camera into the plane. Once this central point is determined, a world transform from the root camera onto the plane can be determined and applied for the extrinsic parameters of all the capture device 204.

FIG. 4 shows illustrative aspects of how a machine learning model may be created and used by system 100 to apply machine learning to volumetric capture of a body according to embodiments described herein. Specifically, as shown, FIG. 4 includes a machine learning system 402 that generates a machine learning model 404 based on input training data 406 and training that may involve human input (e.g., from expert annotators or the like). Machine learning system 402 may incorporate one or more machine learning networks configured to perform various types of machine learning tasks described herein. For instance, one machine learning network incorporated into machine learning system 402 may be a semantic segmentation network configured to semantically segment different components of a body such as different body parts (e.g., right hand, left hand, head, torso, etc. for a human subject). Another machine learning network incorporated into machine learning system 402 may be a joint detection network configured to identify various joints of a body regardless of how the body is oriented (since certain types of bodies such as human bodies may orient themselves in a large number of different possible orientations).

While machine learning system 402 is illustrated as a single, monolithic system in FIG. 4, it will be understood that machine learning system 402 may represent a distributed system or a plurality of different interoperating machine learning networks and systems that are implemented in similar or different ways as one another. For example, different machine learning networks (e.g., a semantic segmentation network, a joint detection network, etc.) may all be implemented using proprietary machine learning networks developed for special-purpose usages as described herein, using open source machine learning networks provided for general-purpose usages, using a combination of proprietary and open source networks, or in other ways as may serve a particular implementation. In various examples, it will be understood that training may be performed by different people and that input training data 406 and output training data 408 may represent separate training data sets that include different data and/or are used in different ways by the different types of machine learning networks.

Regardless of how machine learning system 402 is implemented, machine learning system 402 may produce machine learning model 404 and provide machine learning model 404 to system 100 to help system 100 process one or more 2D images 208 received from one or more capture devices 204. For example, based on machine learning model 404, system 100 may process 2D images 208 in an analogous way that machine learning system 402 has been trained to process images from input training data 406 to generate respective images of output training data 208. In this way, system 100 may accurately and efficiently process 2D images 208 depicting one or more bodies 206 that are to be modeled and system 100 may ultimately generate one or more accurate and efficient 3D reference models 210 representative of the one or more bodies 206.

In FIG. 4, machine learning model 404 generated by machine learning system 402 is shown to be associated with bodies of a human body type. However, as mentioned above, other machine learning systems (or additional machine learning networks incorporated into machine learning system 402) may be configured to generate machine learning models associated with bodies of other body types. For instance, a machine learning system may generate a machine learning model associated with a certain type of animal (or various types of animals), a certain type of inanimate object (or various types of inanimate objects), a certain type of human being (e.g., women, men, children, etc.).

Regardless of the body type with which a machine learning model is associated, it may be the case that bodies of the body type are able to change shape at various inflection points referred to herein as "joints." Such shape changing may be associated with non-rigid deformations that may potentially allow the bodies to take on a wide variety of shapes that may be difficult for a computer to accurately and efficiently process using explicit instructions in conventional computing models. While such explicit computing models are likely to lead to undesirable and/or unpredictable results, machine learning processes described herein may allow computers to more accurately and efficiently process incoming image data. For example, joint detection machine learning processes may allow computers to accurately and efficiently recognize various types of bodies in the wide variety of potential shapes and forms that may be encountered, while semantic segmentation machine learning processes may allow computers to accurately and efficiently distinguish different components of various bodies (e.g., different body parts, etc.).

A particular joint of a body may join two or more body parts included in a set of body parts of a body 206. For example, for a human body type, joints may be found at the neck, shoulders, elbows, wrists, hips, knees, and/or various other parts of the body. It is noted that the term "joint" as used herein may overlap with, but may differ significantly in some respects, from how the term "joint" may be used in a medical or anatomically technical sense. A body 206 of a particular body type may include body parts and joints that correspond to analogous sets of body parts and joints of other bodies of the same particular body type. Accordingly, each body of the particular body type may be able to non-rigidly deform in similar ways such that a machine learning model trained for the particular body type may provide significant insights into non-rigid deformations that may potentially be encountered by system 100 but that may not be practical or possible to be explicitly programmed into system 100.

One way that system 100 may process 2D images 208 using machine learning model 404 is by generating a 2D segmentation dataset for a body 206 depicted by a particular 2D image 208 or sequence of 2D images 208. The 2D segmentation dataset may indicate respective 2D segment locations, from the perspective of the capture device 204, for each body part in the set of body parts. To perform semantic segmentation of the 2D image 208, system 100 may correlate each pixel in the 2D image with a particular segmentation class associated with a particular component of the body. For instance, for the human body type, segmentation classes may include various body parts such as a head, a torso, a left arm, a right arm, a left leg, a right leg, and so forth as may serve a particular implementation. Additionally, system 100 may assign a respective body part label to each segmented body part represented in the 2D segmentation dataset, such that the generating of 3D reference model 210 may be performed based on the respective body part labels assigned to each segmented body part.

To illustrate, images included within training input data 406 show various human bodies in various poses (i.e., various non-rigid deformations in which different joints of the bodies are configured to provide different shapes for all the body parts of the bodies). Machine learning system 402 (including each of potentially multiple machine learning networks incorporated therein) may be trained using automated processes and human input to create a library of human-approved interpretations of the image referred to as "ground truth" interpretations. In some examples, the ground truth interpretations may segment the bodies and identify joints locations for bodies posed in dramatically different configurations. For example, images included within training output data 408 show illustrative ground truth interpretations of body part segmentations of each respective image of training input data 406. In the images of data 408, various body parts 410 such as the head, torso, upper arm (above the elbow), lower arm (below the elbow), hips, upper legs (above the knee), and lower legs (below the knee), are segmented on each image of each body using lines that have been placed by machine learning system 402 during the training process. It will be understood that these segmentations are shown only by way of illustration, and that various different segmentations (including segmentations associated with any of the segmentation classes described herein) may be used as may serve a particular implementation. The segmentations may be accounted for in the mathematical machine learning model 404 generated by machine learning system 402. As such, system 100 may use the machine learning model 404 to accurately and efficiently generate a 2D segmentation dataset that similarly segments each of the different body parts for a 2D image 208 that has not been previously analyzed by a human as part of the training process.

In some examples, system 100 may label each body part (e.g., including each joint in certain examples) as the body parts are identified and segmented based on machine learning model 404 and a 2D image 208. Such labels may be propagated from frame to frame and/or from 2D to 3D in various ways that serve to help generate 3D reference model 210 and that will be described in more detail below. While the bodies shown in FIG. 4 include a few illustrative joints and body parts, it will be understood that certain models of human bodies and/or other body types may include more or fewer joints and body parts.

The training of machine learning system 402 may make it possible for machine learning model 404 to be generated, provided, updated, and so forth, and may be performed using a combination of human input (e.g., by expert annotators, by open source contributors, etc.) and novel automation processes to make efficient use of the human contributors' time and ability in the creation of ground truth interpretations. Specifically, rather than relying on a training expert to place each and every segmentation line and/or corresponding label for each and every training image, machine learning system 402 may use machine learning model 404 itself (even as machine learning model 404 is being generated and improved) to estimate the segmentations and labels for each image. An annotation tool (e.g., a computer interface configured to facilitate the training process for segmentation and/or annotations of body parts) that presents these estimations to a human expert may be employed to make it easy for the expert to either approve the estimated segmentations and labels (if the expert determines that the system has estimated correctly and accurately), or to correct the estimated segmentations and labels (if the expert determines that the system has erred in its estimation). In this way, one or more human experts may team with machine learning system 402 in the machine learning training process to quickly and efficiently generate a large set of training output data 408 (e.g., including hundreds or thousands of images or more) that is accounted for by machine learning model 404 and thereby benefits system 100 as new 2D images 208 are processed. In some examples, machine learning training processes may also use previously trained datasets or non-expert human trainers (e.g., crowd-sourced human resources) or other training techniques as may serve a particular implementation.

Machine learning model 404 may provide various types of insights to the benefit of system 100 once machine learning system 402 is properly trained. For example, joint detection insights related to skeletal locations and features for a particular body type (e.g., the human body type) may include insights associated with the positions of major joints (e.g., elbows, knees, waist, etc.), the locations of limbs (e.g., hand and foot locations, etc.), the locations of primary facial features (e.g., expressions formed using facial muscles around the eyes, nose, mouth, etc.), and so forth. As another example, semantic segmentation insights may be provided that relate to which components of the subject (e.g., body parts, etc.) are present and how they are oriented. Based on these insights, machine learning model 404 may enable system 100 to generate dense per-pixel annotations that map individual pixels to specific body parts. For example, every pixel in a 2D image 208 may be determined to map to the face, arms, legs, or another body part of a body 206 depicted by the 2D image 208 (or to a background or other body if the 2D image 208 captures more than just the depiction of body 206).

The estimations of segmentations and annotations made by machine learning system 402 to facilitate the manual side of the training process may be implemented in any suitable manner. For example, labels may be propagated in space from one frame to another when a sequence of images in training data 406 morphs little by little from image to image (as is typically the case in a video image). As another example, labels may be propagated in time by tracking features in two dimensions (e.g., based on markers, etc.). Any of these or other examples may be used individually or in combination with one another as detailed further in the provisional application.

Based on machine learning model 404 and one or more 2D images 208 captured by one or more capture device 204, system 100 may generate a 3D reference model 210 of a body 206 that is of the body type with which machine learning model 404 is associated and that is depicted in the one or more 2D images 208. System 100 may generate this 3D reference model 210 in any manner as may serve a particular implementation. For example, the generating of the 3D reference model may involve 1) generating a skeletal model for the body 206, 2) generating, based on the skeletal model, a mesh for 3D reference model 210, and 3) texturing the mesh with texture data based on the 2D images.

Figure 5C:
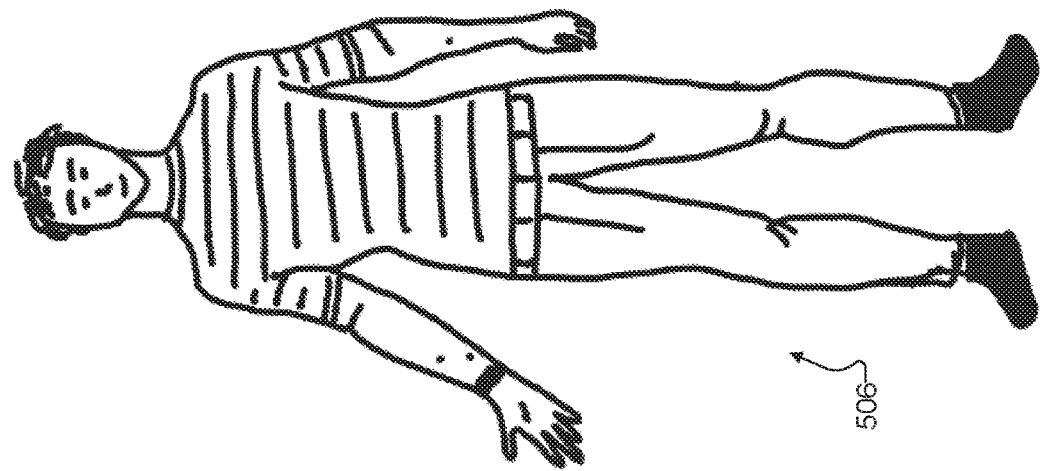
FIG. 5C shows an illustrative texture incorporated into a 3D reference model according to embodiments described herein.
Figure 5B:
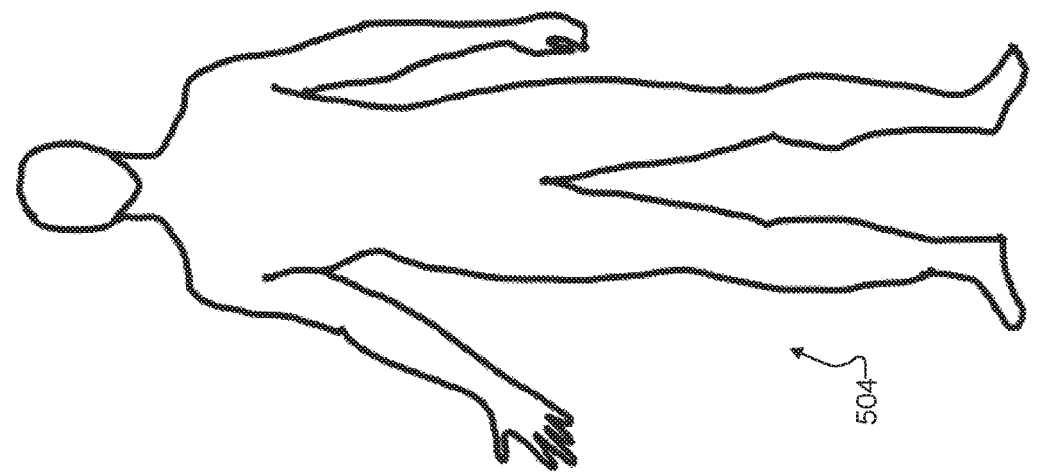
FIG. 5B shows an illustrative mesh incorporated into a 3D reference model according to embodiments described herein.
Figure 5A:
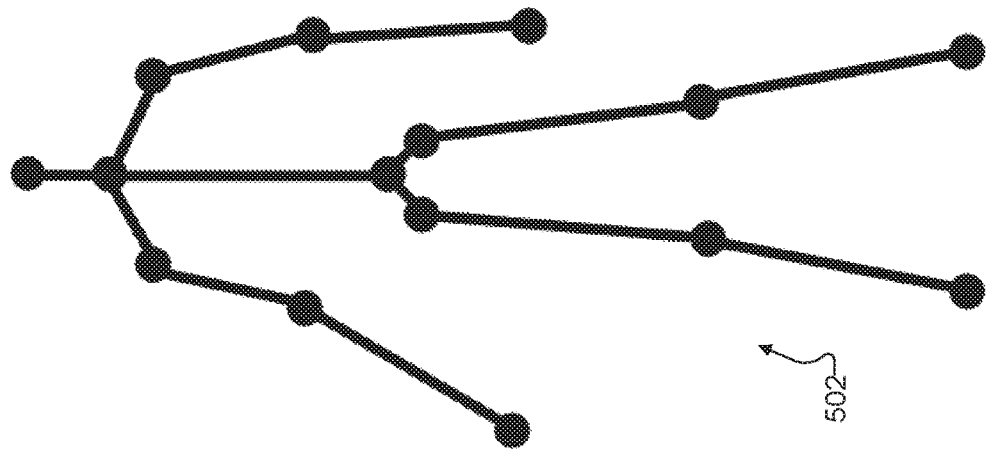
FIG. 5A shows an illustrative skeletal model incorporated into a 3D reference model according to embodiments described herein.

To illustrate, FIG. 5A shows an illustrative skeletal model 502 incorporated into an implementation of 3D reference model 210, FIG. 5B shows an illustrative mesh 504 incorporated into the 3D reference model 210, and FIG. 5C shows an illustrative texture 506 incorporated into the 3D reference model 210.

Skeletal model 502 is shown to include a plurality of model bones (i.e., the line segments) that are connected by a set of joints (i.e., the small circles) that are positioned at respective 3D joint locations. For example, the 3D joint locations may be determined based on 2D joint locations determined from various 2D images captured from the respective perspectives of different capture devices 204 in the ways described. The model bones may be associated with different body parts that have been segmented and labeled by system 100 in any of the ways described above, and it will be understood that the particular joints and model bones illustrated in FIG. 5A are illustrative only, and that various examples may implement more, fewer, or different joints and model bones than those illustrated for skeletal model 502.

Mesh 504 may be formed around skeletal model 502 based on color and/or depth data captured and included within 2D images 208. For example, in examples that utilize RGBD data for 2D images 208, mesh 504 may largely or entirely be formed based on the depth data while texture 506 may largely or entirely be formed based on the RGB (color) data. While not explicitly illustrated in FIG. 5B, it will be understood that mesh 504 may be associated with a 2D segmentation dataset and/or various labels or annotations that indicate and distinguish different body parts of the body 206 modeled by the 3D reference model of which mesh 504 is a part. For example, body parts such as the head, torso, arms, legs, and so forth (and/or specific vertices associated with these body parts) may each be associated with metadata labels or annotations designating them as such.

Based on the labels and annotations, as well as based on color data captured in the 2D images 208 provided by the capture devices 204, mesh 504 may be textured with texture 506 to complete the 3D reference model. For example, color data from various different 2D images capturing the body 206 being modeled may be blended in any suitable way to form a smooth texture for the 3D reference model.

One aim of system 100 while texturing mesh 504 may be to create a smooth, seamless texture. However, this target may be difficult to achieve if real-world scene 202 is not carefully controlled in terms of lighting, objects passing through real-world scene 202, environmental issues within real-world scene 202, glare that may arise, and so forth. Even if these types of aspects (as well as sensor attributes of capture devices 204 and/or other such factors) may be controlled in certain implementations or scenarios, it may be the case in other implementations or scenarios that such aspects are not tightly controlled. Accordingly, system 100 may perform operations to average colors captured by different capture devices in ways that provide consistent and accurately blended colors and that avoid visible seams as much as possible.

To accomplish this texture smoothing, system 100 may calculate vertex visibility with respect to each capture device 204 using a depth test and an occlusion test. Vertex visibility attributes and vertex normals may then be rendered into image space to get per pixel visibility and normal maps for each capture device 204 in the system. Next, it may be desirable to account for potential geometry errors such as, in the human body type example, thinning of limbs, flattening of features (e.g., chins, ears, etc.), and so forth. These errors would manifest in a misprojection of texture 506 onto mesh 504, so, to improve these regions, the edges of the visibility map may be given less weight to reflect the lower degree of confidence there is the closer that a pixel is to a boundary. As long as there are sufficient capture devices 204 used in a particular implementation, there will be overlap of captured imagery such that each boundary area of one 2D image 208 may be better accounted for as a non-boundary area of another 2D image 208. Accordingly, a distance transform is applied to each visibility map to get a pixel distance from the boundary of the non-visible region capped at a radius, and that distance may be used to calculate a new soft visibility value per pixel.

For the actual blending, vertices may be projected into the camera image along with the three potentially closest capture device neighbors (e.g., since these are the capture devices whose images will be blended). For each capture device and its nearest neighbors, system 100 may create a per pixel weight by taking a dot product of the per pixel normal and the vector from the capture device to the vertex. This is multiplied by the soft visibility value (determined according to the description above) and normalized according to the weighted value given to each capture device. After normalization of the capture device weights, system 100 may create a final output color by taking a weighted average of the sampled textures from the capture device and the three closest neighbors.

To texture meshes that have changed incrementally, system 100 may take advantage of a known deformation by always rendering incremental frames into the canonical mesh positions. This may provide an advantage of having a projection that always has the same position in the texture with colors changing, which may facilitate texture compression. Additionally, historical weighting may be applied in certain examples to further improve blending results. For example, weights that have been calculated from the normal, capture-device-to-vertex vector, and soft visibility, may be averaged with weights of previous frames. Any pixel that has a weight of zero may be assigned a historical color (e.g., from the last frame) to eliminate holes due to shadows and the like.

In some examples, system 100 may not only model a body 206 at a single point in time, but may generate and update a continuous 3D reference model 210 that mirrors movement of body 206 over time. Specifically, along with accessing a first 2D image 208 that is captured at a first point in time when the body 206 being depicted is in a first pose and identifying the 2D joint location for the first point in time, system 100 may also access a second 2D image 208 captured (e.g., by the same or a different capture device 204 as the capture device that captured the first 2D image) at a second point in time subsequent to the first point in time. The second 2D image may depict the body in a second pose that is related to the first pose by a non-rigid deformation of the body. Accordingly, using the machine learning model and based on the second 2D image, system 100 may identify the 2D joint location for the second point in time, from the perspective of the capture device. Just as the 3D reference model of the body 206 was generated based on machine learning model 204 and the 2D joint location identified for the first point in time, system 100 may update the 3D reference model of the body 206 based on the 2D joint location for the second point in time. For example, system 100 may update the 3D reference model from simulating the first pose to simulating the second pose. In this way, system 100 may apply machine learning to volumetric capture of the body to accurately model a non-rigid deformation between the first pose and the second pose.

Figure 6B:
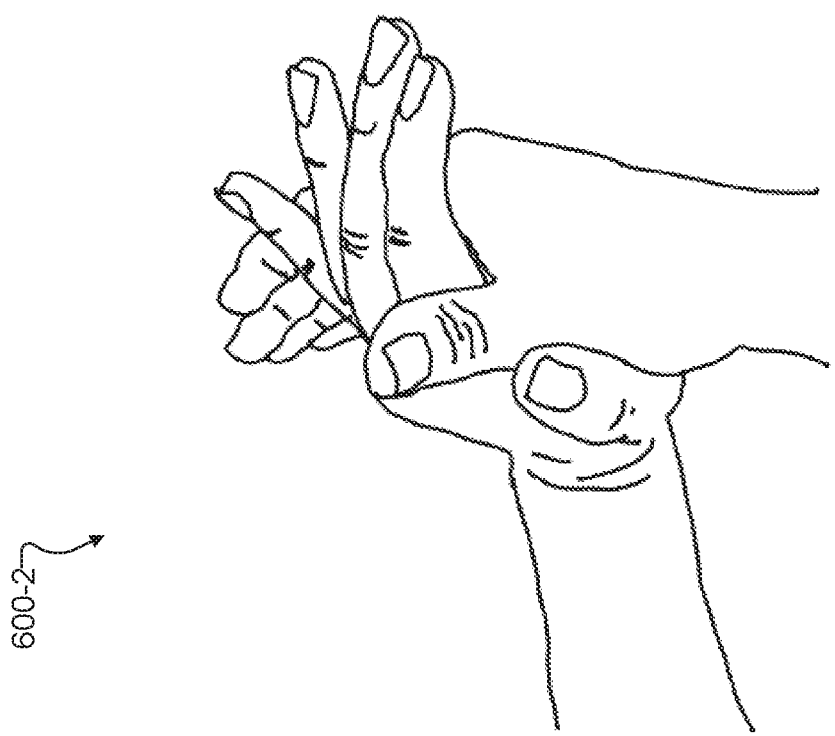
FIGS. 6A-6B show an illustrative non-rigid deformation that may be volumetrically modeled using a volumetric capture system applying machine learning technology according to embodiments described herein.
Figure 6A:
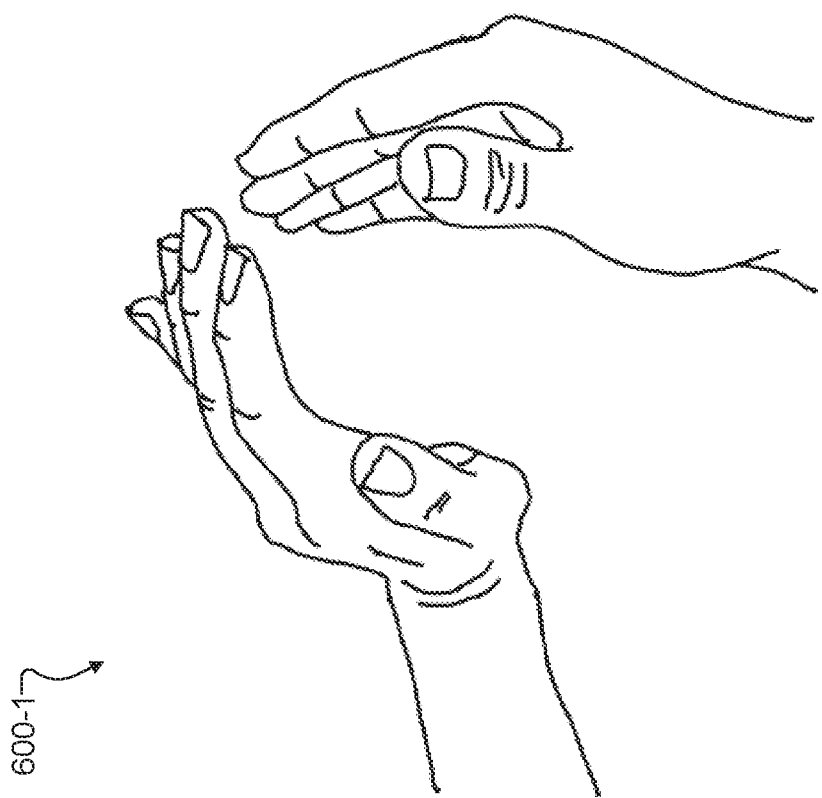

To illustrate, FIGS. 6A and 6B show an illustrative non-rigid deformation that may be volumetrically modeled by a volumetric capture system such as system 100 applying machine learning technology. More particularly, FIG. 6A shows, at a first point in time, a first pose 600-1 of human hands that are in the process of clapping together. FIG. 6B then shows, at a second point in time subsequent to the first point in time, the hands in a second pose 600-2 that is related to pose 600-1 by a non-rigid deformation. With conventional 3D modeling techniques, particularly modeling techniques that are configured to be performed in real time, accurately modeling a non-rigid deformation such as illustrated by FIGS. 6A and 6B may pose a significant technical challenge. For example, if the hands were brought together for long enough that a few keyframes of video representing the hand are processed (e.g., in a relatively slow clapping motion, etc.), conventional 3D modeling techniques are likely to produce modeling errors as 3D models of the hands are constructed and updated. For instance, vertices making up the hands could start to connect and get intermixed so as to form a single, connected mesh after passing several key frames.

Methods and systems for applying machine learning to volumetric capture of a body in a real-world scene may be well adapted to resolve the types of errors described above so as to model the hands in accurate and efficient ways, even when real-time time constraints are required in a particular implementation. For example, semantic segmentation machine learning may help system 100 identify the presence and determine the location of each hand even as the hands join together and come apart in the clapping motion. Moreover, in an implementation that tracks specific joints of the hand, joint detection machine learning may be used to help system 100 identify and track each part of the hand (e.g., each finger, each knuckle, etc.) as various complex hand positions (including clapping positions and so forth) are performed. In these ways, machine learning may help system 100 generate the 3D model of the clapping hands in an accurate manner in which errors are reduced or eliminated. For example, system 100 may accurately interpret pose 600-2 as a model of two hands that are touching one another but are the same two hands recognized at pose 600-1 (rather than a new complex object that has just appeared or the like).

In various non-rigid deformation examples, two important pieces of information may be provided by machine learning model 404 when system 100 is used to apply machine learning to volumetric modeling of a body or a part thereof (e.g., a human body, hands of a human body, etc.). The first piece of information provided is the location of 2D joints from the perspective of each capture device 204, and the second piece of information is 2D body part segmentation datasets from the perspective of each capture device 204. From the 2D joint locations, a single 3D joint location is extracted for each joint and a skeleton model such as skeleton model 502 is built for a reference mesh such as mesh 504. Meanwhile, from the 2D body part segmentation that has been performed, system 100 may assign respective body part labels to each vertex in the reference mesh. These labels will help determine which vertices are affected by which bone in the skeleton. Using the skeleton model and skeleton-vertex connectivity graph, a deformation of the vertices may be defined using the skeleton model. For example, each bone in the skeleton may be given a suitable number of potential deformation parameters and each vertex may be properly deformed using the parameters of the bones it is connected to.

When a continuously updated 3D reference model (e.g., a 3D model that moves in space as a function of time) is generated, either for real-time or time-shifted rendering, it may be desirable to store and/or transmit data representative of the 3D reference model as efficiently as possible. To this end, system 100 may be configured to compress 3D reference model data that is representative of a 3D reference model (e.g., a 3D reference model 210) over a time period during which the 3D reference model undergoes a non-rigid deformation (e.g., a non-rigid deformation such as illustrated in FIGS. 6A and 6B). This compression may be performed in any suitable manner. For example, the compressed 3D reference model data may include different frames that include different amounts of data representing the 3D reference model. In one implementation, for instance, the compressed 3D reference model data may include a key frame that independently represents the 3D reference model at a first point in time during the time period, and an update frame associated with the key frame and that dependently represents the 3D reference model at a second point in time during the time period. The dependent representation of the 3D reference model may include a representation of a difference between the 3D reference model as independently represented by the key frame at the first point in time and the 3D reference model at the second point in time.

Figure 7:
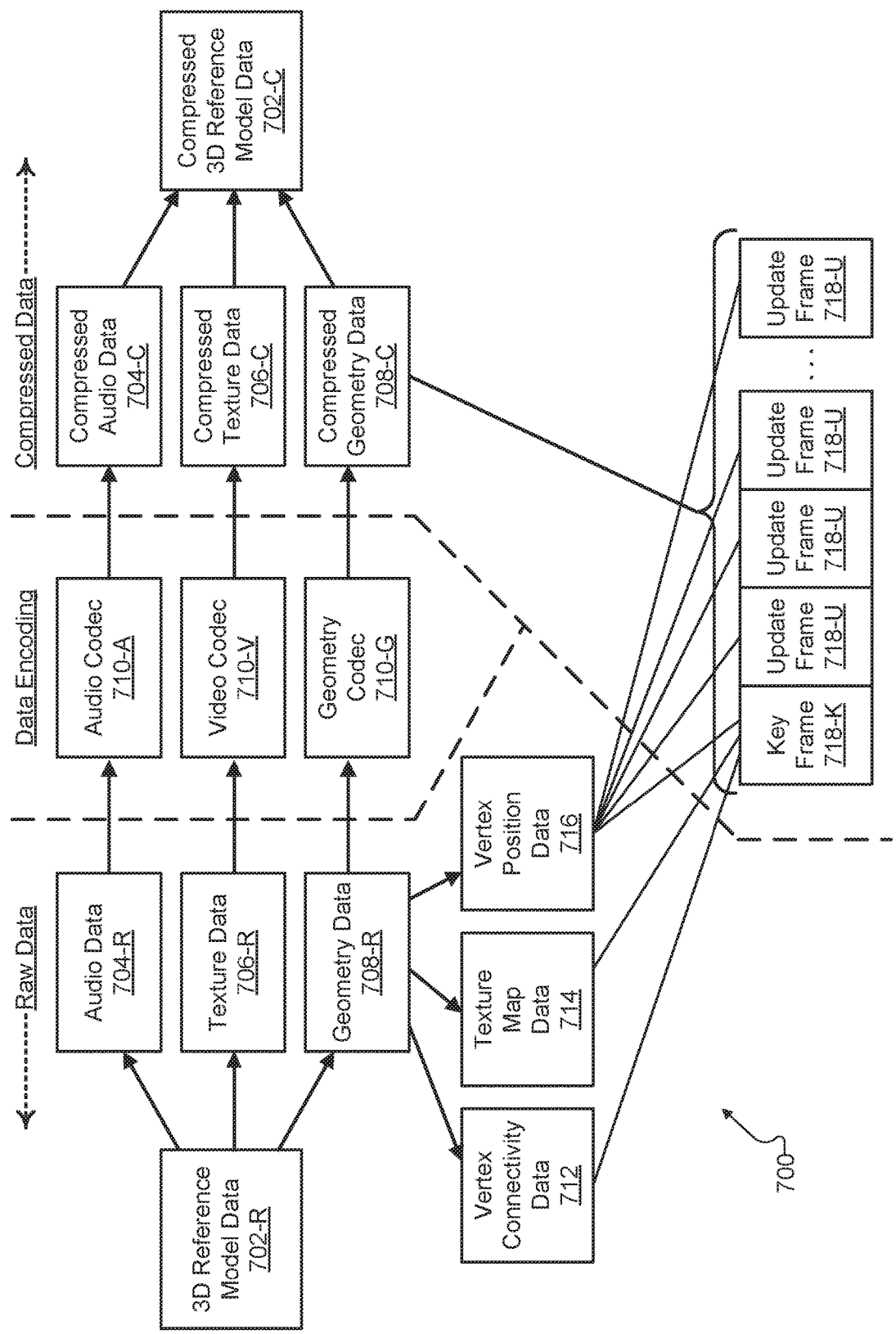
FIG. 7 shows an illustrative dataflow for efficiently compressing 3D reference model data according to embodiments described herein.

To illustrate, FIG. 7 shows an illustrative dataflow 700 for efficiently compressing 3D reference model data. In dataflow 700, data that has not yet been compressed (also referred to herein as "raw" data) may be denoted with an "R", while compressed data may be denoted with a "C". Accordingly, as shown, dataflow shows one illustrated implementation of how raw 3D reference model data 702-R may be processed to ultimately generate compressed 3D reference model data 702-C.

In FIG. 7, 3D reference model data 702-R is shown to include three different types of data: audio data 704-R, texture data 706-R, and geometry data 708-R. The compressing of 3D reference model data 702-R may include bifurcating geometry data 708-R from texture data 706-R and audio data 704-R such that a geometry data compression technique may be used for compressing geometry data 708-R while one or more compression techniques distinct from the geometry data compression technique may be used for compressing texture data 706-R and audio data 704-R. For example, a commodity audio codec 710-A (e.g., an Advanced Audio Coding ("AAC") codec or other such commodity audio codec) may be used to encode audio data 704-R to generate compressed audio data 704-C, and a commodity video codec 710-V (e.g., an H.264 codec or other such commodity video codec) may be used to encode texture data 706-R to generate compressed texture data 706-C. While such commodity codecs may be suitable for compressing the audio and texture data, however, a geometry codec 710-G used to perform the geometry data compression technique to compress geometry data 708-R into compressed geometry data 708-C may be specially configured for this application and not available in any commodity codec.

As shown in FIG. 7, geometry data 708-R may include three types of data: vertex connectivity data 712, texture map data 714, and vertex position data 716. Vertex connectivity data 712 may be representative of how each vertex in a plurality of vertices of a mesh (e.g., mesh 504) is connected to other vertices in the plurality of vertices to form a plurality of geometric shapes (e.g., triangles or another suitable geometric shape) that form the mesh. Texture map data 714 may be representative of respective segments of texture data that are to be used for each of the plurality of geometric shapes forming the mesh. Vertex position data may be representative of a respective location of each vertex in the plurality of vertices of the mesh.

Accordingly, to compress the three types of data included within geometry data 708-R, the geometry data compression technique implemented by geometry codec 710-G may involve generating a key frame 718-K to represent all three types of data (i.e., vertex connectivity data 712, texture map data 714, and vertex position data 716), as well as generating one or more update frames 718-U that are associated with key frame 718-K and represent only vertex position data 716 (while abstaining from representing any vertex connectivity data 712 or texture map data 714). In this way, a single key frame may provide all the vertex connectivity data and texture map data for a plurality of frames that are associated with a length of time (e.g., 30 frames associated with an entire second of reference model animation in an example using 30 frames per second).

One benefit of compressing the geometry data 708-R using the geometry encoding technique of geometry codec-G is that, instead of saving a full mesh every frame, one mesh is saved each key frame and deformation parameters that take that mesh from the key frame to current frame are all that are saved in each update frame 718-U. In this way, system 100 may have significantly less data to store and/or transmit (i.e. compressed geometry data 708-C may be considerably smaller than geometry data 708-R and compressed 3D reference model data 702-C may be considerably smaller than 3D reference model data 702-R). This significant data compression may facilitate the storage and transmission of the large amounts of data associated with volumetric capture, particularly in examples where 3D reference models are to be provided over consumer grade broadband connections (e.g., mobile LTE/5G connections, etc.).

Geometry codec 710-G may be configured to increase or ensure the quality of compressed geometry data 708-C in various ways in addition to the frame-based compression described above. For example, geometry codec 710-G may preserve vertex labels to ensure mesh quality (e.g., to avoid connecting vertices that belong to separate body parts that should not be connected such as different fingers on different hands in the example illustrated in FIGS. 6A and 6B, etc.). As another example, geometry codec 710-G may encode vertex positions using a lossy compression method that uses fewer bits than the number of bits needed for full floating-point precision (i.e., 32 bits). The number of bits used may be referred to as a "quantization parameter" and may be adjusted to maintain the same minimum required perceptual (i.e. user-perceived) quality while maximizing compression. An optimization of quantization parameter may be performed independently for each encoded floating point array (e.g., each set of vertex position data) so that if some captured data involves relatively little motion, the vertex position differences will be smaller and may use a smaller quantization parameter to compress the data further than if a larger quantization parameter is used. In this way, only a minimum number of bits required per floating point may be used, therefore minimizing the overall encoding bitrate.

Figure 8:
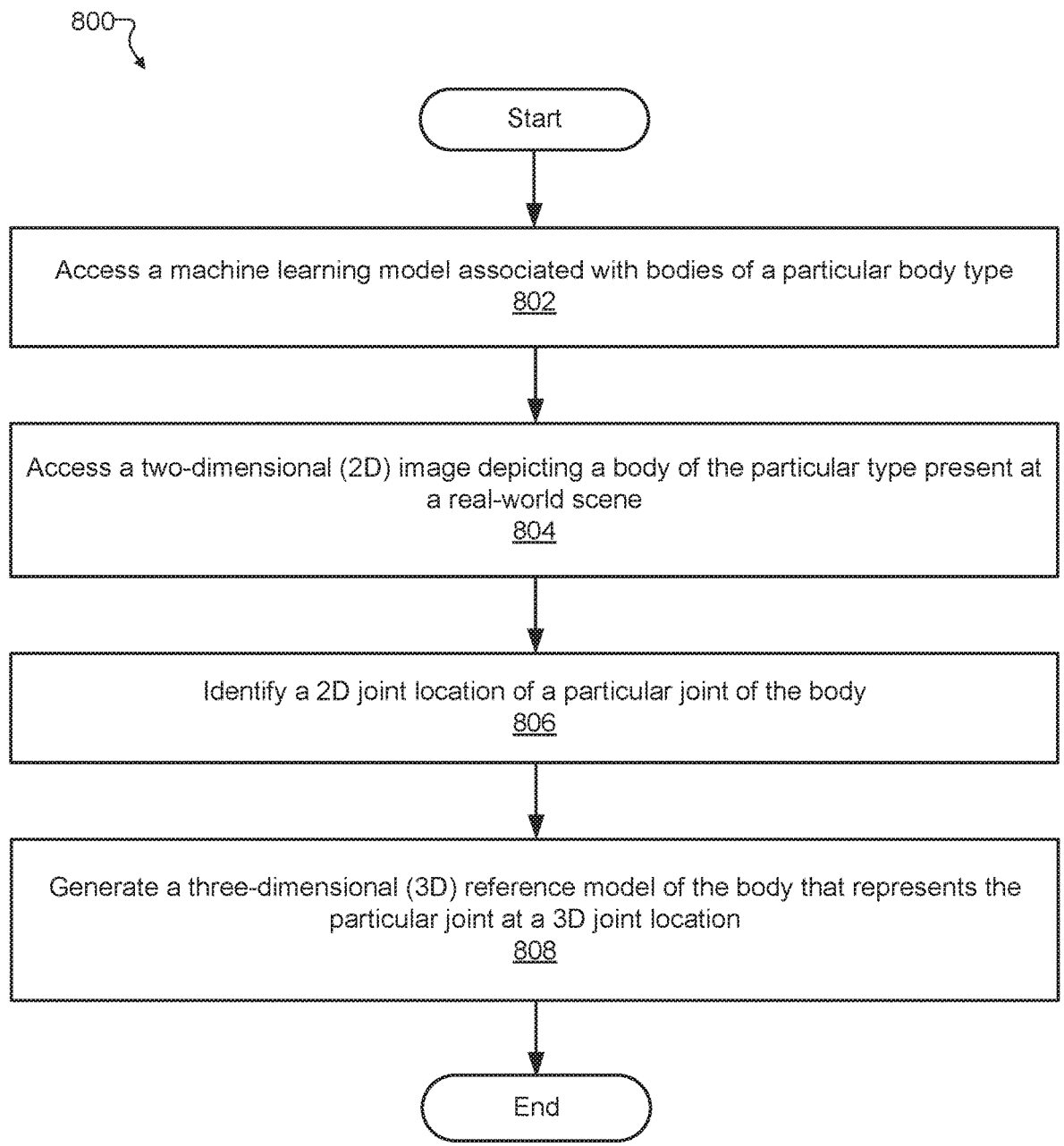
FIG. 8 shows an illustrative method for applying machine learning to volumetric capture of a body in a real-world scene according to embodiments described herein.

FIG. 8 shows an illustrative method 800 for applying machine learning to volumetric capture of a body in a real-world scene. While FIG. 8 shows illustrative operations according to one embodiment, other embodiments may omit, add to, reorder, and/or modify any of the operations shown in FIG. 8. One or more of the operations shown in FIG. 8 may be performed by a volumetric capture system such as system 100, any components included therein, and/or any implementation thereof.

In operation 802, volumetric capture system may access a machine learning model associated with bodies of a particular body type. Operation 802 may be performed in any of the ways described herein.

In operation 804, the volumetric capture system may access a 2D image captured by a capture device located at a real-world scene. For example, the 2D image may depict a body that is of the particular body type and that is present at the real-world scene. Operation 804 may be performed in any of the ways described herein.

In operation 806, the volumetric capture system may identify a 2D joint location of a particular joint of the body. The 2D joint location may be identified from a perspective of the capture device by basing the 2D joint location on the 2D image accessed in operation 804 and by using the machine learning model accessed in operation 802. Operation 806 may be performed in any of the ways described herein.

In operation 808, the volumetric capture system may generate a 3D reference model of the body. For example, the 3D reference model may represent the particular joint of the body at a 3D joint location that is determined based on the 2D joint location identified in operation 806 using the machine learning model. Operation 808 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 9:
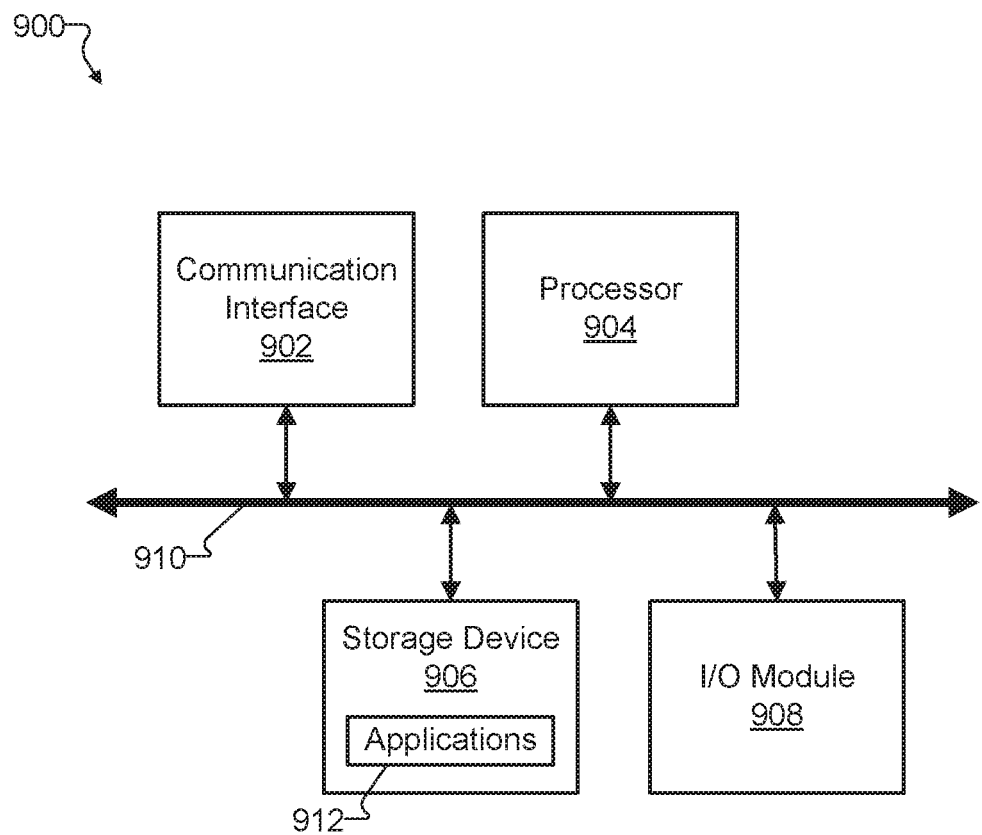
FIG. 9 shows an illustrative computing device according to embodiments described herein.

FIG. 9 shows an illustrative computing device 900 that may be specifically configured to perform one or more of the processes described herein. For example, computing device 900 may include or implement (or partially implement) a volumetric capture system such as system 100, a media player device such as media player device 214, a calibration system such as described in relation to FIGS. 2 and 3, a machine learning system such as machine learning system 402, any of audio codecs 710, or any other computing devices described herein.

As shown in FIG. 9, computing device 900 may include a communication interface 902, a processor 904, a storage device 906, and an input/output ("I/O") module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processing facility 104 of system 100. Likewise, storage facility 102 of system 100 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a volumetric capture system, a machine learning model associated with bodies of a particular body type;
   accessing, by the volumetric capture system, a two-dimensional (2D) image captured by a capture device located at a real-world scene, the 2D image depicting a body present at the real-world scene, the body being of the particular body type;
   identifying, by the volumetric capture system using the machine learning model and based on the 2D image, a 2D joint location, from a perspective of the capture device, of a particular joint of the body;
   generating, by the volumetric capture system, a three-dimensional (3D) reference model of the body over a time period during which the body undergoes a deformation, the 3D reference model including a mesh having a plurality of vertices and representing the particular joint of the body at a 3D joint location that is determined based on the 2D joint location identified using the machine learning model; and
   compressing, by the volumetric capture system, the 3D reference model by generating:
   a key frame that independently represents the 3D reference model at a first point in time during the time period, the key frame including vertex position data for the mesh at the first point in time, and further including vertex connectivity data and texture map data for the mesh at the first point in time and throughout the time period; and
   an update frame associated with the key frame and that dependently represents the 3D reference model at a second point in time during the time period, the update frame including updated vertex position data for the mesh at the second point in time, excluding vertex connectivity data for the mesh at the second point in time, and excluding texture map data for the mesh at the second point in time.

2. The method of claim 1, wherein:
   the particular joint joins two body parts included in a set of body parts of the body, the set of body parts corresponding to analogous sets of body parts of each of the bodies of the particular body type;
   the method further comprises:
   generating, by the volumetric capture system using the machine learning model and based on the 2D image, a 2D segmentation dataset for the body, the 2D segmentation dataset indicative of respective 2D segment locations, from the perspective of the capture device, for each body part in the set of body parts, and
   assigning, by the volumetric capture system to each segmented body part represented in the 2D segmentation dataset, a respective body part label; and
   the generating of the 3D reference model is performed based on the respective body part labels assigned to each segmented body part.

3. The method of claim 1, wherein:
   the 2D image is captured by the capture device at the first point in time and depicts the body in a first pose;
   the 2D joint location is identified for the first point in time; and
   the method further comprises:
   accessing, by the volumetric capture system, an additional 2D image captured by the capture device at the second point in time subsequent to the first point in time, the additional 2D image depicting the body in a second pose that is related to the first pose by the deformation that the body undergoes over the time period, identifying, by the volumetric capture system using the machine learning model and based on the additional 2D image, the 2D joint location, from the perspective of the capture device, for the second point in time, and updating, by the volumetric capture system based on the 2D joint location for the second point in time, the 3D reference model of the body from simulating the first pose to simulating the second pose.

4. The method of claim 1, wherein the deformation that the body undergoes during the time period is a non-rigid deformation.

5. The method of claim 1, wherein:
the compressed 3D reference model includes geometry data, texture data, and audio data; and
the compressing of the 3D reference model data includes bifurcating the geometry data from the texture and audio data such that a geometry data compression technique is used for compressing the geometry data while one or more compression techniques distinct from the geometry data compression technique are used for compressing the texture and audio data.

6. The method of claim 5, wherein:
the geometry data includes the vertex position data, the vertex connectivity data, and the texture map data;
the vertex position data is representative of a respective location of each vertex in the plurality of vertices of the mesh;
the vertex connectivity data is representative of how each vertex in the plurality of vertices is connected to other vertices in the plurality of vertices to form a plurality of geometric shapes forming the mesh; and
the texture map data is representative of a respective segment of texture data that is to be used for each of the plurality of geometric shapes forming the mesh.

7. The method of claim 1, wherein the generating of the 3D reference model comprises:
generating a skeletal model for the body, the skeletal model including model bones connected by a set of joints positioned at respective 3D joint locations, the set of joints including the particular joint positioned at the 3D joint location;
generating, based on the skeletal model, the mesh for the 3D reference model; and
texturing the mesh with texture data based on the 2D image.

8. The method of claim 1, wherein:
the method further comprises:
accessing, by the volumetric capture system, an additional 2D image depicting the body, the additional 2D image captured by an additional capture device located at the real-world scene and having a perspective distinct from the perspective of the capture device, and
identifying, by the volumetric capture system using the machine learning model and based on the additional 2D image, an additional 2D joint location, from the perspective of the additional capture device, of the particular joint of the body; and
the generating of the 3D reference model representing the particular joint of the body at the 3D joint location is performed based on the 2D joint location from the perspective of the capture device and based on the additional 2D joint location from the perspective of the additional capture device.

9. The method of claim 1, wherein the particular body type is a human, the bodies of the particular body type associated with the machine learning model include one or more human bodies of one or more people, and the body present at the real-world scene is a body of a particular person.

10. The method of claim 1, wherein the capture device capturing the 2D image at the real-world scene is calibrated using a fixture with a plurality of faces each depicting a calibration pattern featuring a chessboard pattern including squares of a first color that alternate with squares of a second color, the chessboard pattern including a binary fiducial marker associated with each square of the first color.

11. A system comprising:
a memory storing instructions; and
a processor communicatively coupled to the memory and configured to execute the instructions to:
access a machine learning model associated with bodies of a particular body type;
access a two-dimensional (2D) image captured by a capture device located at a real-world scene, the 2D image depicting a body present at the real-world scene, the body being of the particular body type;
identify, using the machine learning model and based on the 2D image, a 2D joint location, from a perspective of the capture device, of a particular joint of the body;
generate a three-dimensional (3D) reference model of the body over a time period during which the body undergoes a deformation, the 3D reference model including a mesh having a plurality of vertices and representing the particular joint of the body at a 3D joint location that is determined based on the 2D joint location identified using the machine learning model; and
compress the 3D reference model by generating:
a key frame that independently represents the 3D reference model at a first point in time during the time period, the key frame including vertex position data for the mesh at the first point in time, and further including vertex connectivity data and texture map data for the mesh at the first point in time and throughout the time period; and
an update frame associated with the key frame and that dependently represents the 3D reference model at a second point in time during the time period, the update frame including updated vertex position data for the mesh at the second point in time, excluding vertex connectivity data for the mesh at the second point in time, and excluding texture map data for the mesh at the second point in time.

12. The system of claim 11, wherein:
the particular joint joins two body parts included in a set of body parts of the body, the set of body parts corresponding to analogous sets of body parts of each of the bodies of the particular body type;
the processor is further configured to execute the instructions to:
generate, using the machine learning model and based on the 2D image, a 2D segmentation dataset for the body, the 2D segmentation dataset indicative of respective 2D segment locations, from the perspective of the capture device, for each body part in the set of body parts, and assign, to each segmented body part represented in the 2D segmentation dataset, a respective body part label; and the generating of the 3D reference model is performed based on the respective body part labels assigned to each segmented body part.

13. The system of claim 11, wherein:
the 2D image is captured by the capture device at the first point in time and depicts the body in a first pose;
the 2D joint location is identified for the first point in time; and
the processor is further configured to execute the instructions to:
access an additional 2D image captured by the capture device at the second point in time subsequent to the first point in time, the additional 2D image depicting the body in a second pose that is related to the first pose by the deformation that the body undergoes over the time period,
identify, using the machine learning model and based on the additional 2D image, the 2D joint location, from the perspective of the capture device, for the second point in time, and
update, based on the 2D joint location for the second point in time, the 3D reference model of the body from simulating the first pose to simulating the second pose.

14. The system of claim 11, wherein the deformation that the body undergoes during the time period is a non-rigid deformation.

15. The system of claim 11, wherein:
the compressed 3D reference model includes geometry data, texture data, and audio data; and
the compressing of the 3D reference model data includes bifurcating the geometry data from the texture and audio data such that a geometry data compression technique is used for compressing the geometry data while one or more compression techniques distinct from the geometry data compression technique are used for compressing the texture and audio data.

16. The system of claim 15, wherein:
the geometry data includes the vertex position data, the vertex connectivity data, and the texture map data;
the vertex position data is representative of a respective location of each vertex in the plurality of vertices of the mesh;
the vertex connectivity data is representative of how each vertex in the plurality of vertices is connected to other vertices in the plurality of vertices to form a plurality of geometric shapes forming the mesh; and
the texture map data is representative of a respective segment of texture data that is to be used for each of the plurality of geometric shapes forming the mesh.

17. The system of claim 11, wherein the generating of the 3D reference model comprises:
generating a skeletal model for the body, the skeletal model including model bones connected by a set of joints positioned at respective 3D joint locations, the set of joints including the particular joint positioned at the 3D joint location;

generating, based on the skeletal model, the mesh for the 3D reference model; and texturing the mesh with texture data based on the 2D image.

18. The system of claim 11, wherein:
the processor is further configured to execute the instructions to:
access an additional 2D image depicting the body, the additional 2D image captured by an additional capture device located at the real-world scene and having a perspective distinct from the perspective of the capture device, and
identify, using the machine learning model and based on the additional 2D image, an additional 2D joint location, from the perspective of the additional capture device, of the particular joint of the body; and
the generating of the 3D reference model representing the particular joint of the body at the 3D joint location is performed based on the 2D joint location from the perspective of the capture device and based on the additional 2D joint location from the perspective of the additional capture device.

19. The system of claim 11, wherein the particular body type is a human, the bodies of the particular body type associated with the machine learning model include one or more human bodies of one or more people, and the body present at the real-world scene is a body of a particular person.

20. A non-transitory computer-readable medium storing instructions that, when executed, direct a processor of a computing device to:
access a machine learning model associated with bodies of a particular body type;
access a two-dimensional (2D) image captured by a capture device located at a real-world scene, the 2D image depicting a body present at the real-world scene, the body being of the particular body type;
identify, using the machine learning model and based on the 2D image, a 2D joint location, from a perspective of the capture device, of a particular joint of the body;
generate a three-dimensional (3D) reference model of the body over a time period during which the body undergoes a deformation, the 3D reference model including a mesh having a plurality of vertices and representing the particular joint of the body at a 3D joint location that is determined based on the 2D joint location identified using the machine learning model; and
compress the 3D reference model by generating:
a key frame that independently represents the 3D reference model at a first point in time during the time period, the key frame including vertex position data for the mesh at the first point in time, and further including vertex connectivity data and texture map data for the mesh at the first point in time and throughout the time period; and
an update frame associated with the key frame and that dependently represents the 3D reference model at a second point in time during the time period, the update frame including updated vertex position data for the mesh at the second point in time, excluding vertex connectivity data for the mesh at the second point in time, and excluding texture map data for the mesh at the second point in time.

* * * * *